(12) United States Patent
Genz et al.

(10) Patent No.: US 6,197,839 B1
(45) Date of Patent: Mar. 6, 2001

(54) PROCESS FOR PREPARING COMPACT OR CELLULAR POLYURETHANE ELASTOMERS AND ISOCYANATE PREPOLYMERS SUITABLE FOR THIS PURPOSE

(75) Inventors: Manfred Genz, Damme; Walter Haselhorst, Osnabrück; Torsten Jeschke, Wehrendorf; Ute Bruns, Lingen; Heinz Bollmann, Alfhausen; Michael Strauss; Wolfgang Scholz, both of Lemförde; Rüdiger Voelkel, Bensheim; Hartmut Peuker, Bissendorf; Gerhard Hellmann, Bad Dürkheim, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/214,730

(22) PCT Filed: Jun. 30, 1997

(86) PCT No.: PCT/EP97/03396

§ 371 Date: Jan. 11, 1999

§ 102(e) Date: Jan. 11, 1999

(87) PCT Pub. No.: WO98/02476

PCT Pub. Date: Jan. 22, 1998

(30) Foreign Application Priority Data

Jul. 11, 1996 (DE) ............................ 196 27 907

(51) Int. Cl.$^7$ .................................................. C08J 9/04
(52) U.S. Cl. ..................... 521/130; 521/131; 521/172; 521/173; 521/174; 528/44; 528/60; 528/65; 528/85
(58) Field of Search ................................. 521/130, 131, 521/172, 173, 174; 528/44, 60, 65, 85

(56) References Cited

U.S. PATENT DOCUMENTS 4,191,818 * 3/1980 Illers et al. .......................... 528/44

FOREIGN PATENT DOCUMENTS

| 19538330 | 4/1997 | (DE) . |
| 0316150 | 5/1989 | (EP) . |
| 118955 | 11/1983 | (GB) . |

OTHER PUBLICATIONS

Translation of PCT International Preliminary Examination Report Dated Sep. 17, 1998.
Derwent Abstract of DE 19538330 (1997).

* cited by examiner

Primary Examiner—John M. Cooney, Jr.
(74) Attorney, Agent, or Firm—Fernando A. Borrego

(57) ABSTRACT

Compact and preferably cellular polyurethane elastomers are prepared by reacting
  a) relatively high molecular weight polyhydroxyl compounds and if desired,
  b) low molecular weight chain extenders and/or crosslinkers with
  c) phenylene 1,4-diisocyanate (p-PDI) and at least one additional aromatic diisocyanate selected from the group consisting of tolylene diisocyanate, diphenylmethane diisocyanate, 3,3'-dimethylbiphenyl diisocyanate, 1,2-diphenylethane diisocyanate and/or aliphatic diisocyanate, having from 4 to 12 carbon atoms and/or cycloaliphatic diisocyanate having from 6 to 18 carbon atoms, where the formative components (a), (c) and, if used, (b) are advantageously reacted by the prepolymer method,
in the presence or absence of
  d) catalysts,
  e) blowing agents and
  f) additives.
Isocyanate prepolymers suitable for this purpose are described.

16 Claims, No Drawings

PROCESS FOR PREPARING COMPACT OR CELLULAR POLYURETHANE ELASTOMERS AND ISOCYANATE PREPOLYMERS SUITABLE FOR THIS PURPOSE

The present invention relates to a process for preparing compact and preferably cellular polyurethane elastomers, hereinafter also abbreviated as PU elastomers.

The preparation of compact or cellular, eg. microcellular, PU elastomers has long been known from numerous patent and literature publications.

Their industrial importance is based on the combination of good mechanical properties with the advantages of the inexpensive processing methods. The use of different types of chemical formative components in different ratios makes it possible to prepare thermoplastically processable or crosslinked, compact or cellular PU elastomers which differ widely in respect of their processability and their mechanical properties. An overview of PU elastomers, their properties and applications is given, for example, in Kunststoff-Handbuch, Volume 7, Polyurethane. 1st edition, 1966, edited by Dr R. Vieweg and Dr A. Höchtlen, 2nd edition, 1983, edited by Dr G. Oertel, and 3rd edition, 1993, edited by Prof. G. W. Becker and Prof. D. Braun, (Carl-Hanser-Verlag, Munich, Vienna).

Compared with the types of rubber which can be used in a similar manner, microcellular PU elastomers have significantly improved damping properties and an excellent volume compressibility so that they are used as constituents of vibration- and shock-damping systems, in particular in the automobile industry. For preparing microcellular PU elastomers, reaction products of 1,5-NDI and poly(ethylene glycol adipate) having a molecular weight of 2,000 which are reacted in the form of an isocyanate prepolymer with an activator-containing, aqueous solution of a fatty acid sulfonate have been found to be useful. (Kunststoff-Handbuch, Volume 7, Polyurethane, 1st edition, pages 270ff.)

Since such base formulations give microcellular PU elastomers having very good damping characteristics and static and dynamic performance parameters, the prior art discloses only a few efforts to replace the 1,5-NDI responsible for the good elastomeric properties, despite the fact that it is more difficult to handle because of its high melting point, by more readily handleable and less expensive diisocyanates since this leads to significantly poorer mechanical properties.

Characteristic property differences between compact PU elastomers in general and microcellular PU elastomers in particular based on 1,5-NDI and 4,4'-MDI are presented in Journal of Elastomers and Plastics, Vol. 21, (1989), pages 100 to 121. Important disadvantages given for a microcellular PU elastomer based on 4,4'-MDI are a significantly higher degree of damping with increased material heating and significantly increased consolidation values under dynamic loading which finally lead to a more rapid material wear in comparison with PU elastomers based on 1,5-NDI.

Despite these known disadvantages, attempts have been made in the preparation of microcellular PU elastomers to replace the 1,5-NDI by the lower-melting and less expensive 4,4'-MDI. However, these attempts have been restricted to the use of new starting components, in particular relatively high molecular weight polyhydroxyl compounds, the use of which improves certain mechanical properties of the microcellular PU elastomers.

EP-A-0 496 204 (U.S. Pat. No. 5,173,518) describes a process for preparing cellular PU elastomers using polyether polycarbonate diols containing polyoxytetramethylene glycol groups having a mean molecular weight of from 150 to 500 in condensed-in form as relatively high molecular weight polyhydroxyl compounds. This improves the mechanical properties, in particular the elongation at break, even at relatively low temperatures. However, there is no noticeable improvement in the static compressive sets in accordance with DIN 53 572 at 70° C. which are known to correlate with the dynamic consolidation values. Even when using 1,5-NDI as polyisocyanate, only average static compressive sets are obtained.

EP-B-0 243 832 (U.S. Pat. No. 4,798,851), which describes the use of pseudoprepolymers based on 4,4'-MDI in the presence or absence of water as blowing agent for producing elastic, compact or cellular PU or PU-polyurea moldings teaches the use of a hydroxyl-containing polycondensate of a short-chain polyoxytetramethylene glycol and an aliphatic dicarboxylic acid as relatively high molecular weight polyhydroxyl compound with the purpose of obtaining a polyhydroxyl compound containing ester groups which is readily able to be metered by means of pumping for cellular or compact PU elastomers having improved mechanical and hydrolytic properties. Details of degrees of permanent deformation under static or dynamic loading, by means of which vibration-resistant materials are customarily characterized, are not disclosed.

DE-A-36 13 961 (U.S. Pat. No. 4,647,596) describes a microcellular PU elastomer based on 4,4'-MDI which, owing to a defined composition of the relatively high molecular weight polyhydroxyl compounds comprising a copolymer of polytetrahydrofuran and ε-caprolactone, has mechanical properties which represent a favorable compromise between static strength and dynamic stressability. Despite the use of expensive starting materials for preparing the polyhydroxyl compounds, the resulting performance improvement in terms of the test values "product durability, flexural strength by the De Mattia method and permanent deformation at 50% compression" is only relatively small. For example, the measured values for the compressive set which are directly related to the practically important parameter of dynamic consolidation are improved only slightly by applying the teachings of the invention.

In addition, the test criteria used, viz. "product durability and flexural strength by the De Mattia method", do not appear to be sufficiently suitable for an assessment of the dynamic properties which is close to practice, since in the case of partial property improvements they are not able to satisfactorily show up the actual property differences between polyurethane elastomers based on 4,4'-MDI and 1,5-NDI. Thus, the example based on 1,5-NDI shows no better level of properties than the examples based on 4,4'-MDI.

The stagewise preparation of PU elastomers is also known. According to DE-A-25 47 864 (U.S. Pat. No. 4,191,818), a heat-resistant PU elastomer can be prepared by reacting an essentially linear relatively high molecular weight dihydroxy compound with a deficiency of diisocyanate to give an adduct having terminal hydroxyl groups and subsequently reacting this adduct with a symmetric aromatic diisocyanate in excess and alkanediols or di(alkylene glycol) terephthalates as chain extenders. If cellular PU elastomers are to be prepared by this method, water, if desired in combination with alkanediols and/or di(alkylene glycol) terephthalates, can also be used as chain extenders.

Cellular PU elastomers can also be prepared by the process described in DE-A-2 940 856 (U.S. Pat. No. 4,334, 033). According to this process, the relatively high molecular weight polyhydroxyl compounds and, if desired, chain extenders are reacted with an organic diisocyanate in a ratio of OH to NCO groups of from 1.2:1 to 2:1 to give a hydroxyl-containing prepolymer. This is divided in a weight ratio of about 80–20:20–80 into components (I) and (II); the component (I) is reacted with 1,5-NDI in a ratio of OH:NCO groups of 1:2.5–12 to give an NDI-polyurethane adduct containing NCO groups and the component (II) is combined with chain extenders, water and additives to form a mixture (II). The NDI-polyurethane adduct and the mixture (II) are finally reacted to give a compact or cellular PU elastomer. This process enables the formative components to be metered exactly and mixed rapidly and intensively. The PU elastomers are homogeneous and have uniform mechanical properties over the entire molding.

It is an object of the present invention to provide a process for preparing compact or preferably microcellular PU elastomers in which the expensive 1,5-NDI can be replaced at least partially by more readily handleable and less expensive organic diisocyanates or mixtures of diisocyanates. Despite the concomitant use of other organic diisocyanates, the mechanical properties of the PU elastomers prepared are to be improved or at least correspond essentially to those based on 1,5-NDI. Regardless of the type of relatively high molecular weight polyhydroxyl compounds used, the microcellular PU elastomers are to have clearly improved static and mechanical properties compared with PU elastomers based on 4,4'-MDI, in particular compressive sets and dynamic consolidation values, so that they can be used, in particular, for producing vibration- and shock-damping systems.

We have found that this object is achieved by a process for preparing compact or cellular, preferably microcellular, PU elastomers by reacting a) relatively high molecular weight polyhydroxyl compounds and, if desired, b) low molecular weight chain extenders and/or crosslinkers with c) organic polyisocyanates in the presence or absence of d) catalysts, e) blowing agents and f) additives, wherein the organic polyisocyanates used are phenylene 1,4-diisocyanate (p-PDI) and at least one additional aromatic diisocyanate selected from the group consisting of toluene diisocyanate, diphenylmethane diisocyanate, 3,3'-dimethylbiphenyl diisocyanate, 1,2-diphenylethane diisocyanate, and/or aliphatic diisocyanate having from 4 to 12 carbon atoms and/or cycloaliphatic diisocyanate having from 6 to 18 carbon atoms.

According to the method of preparation preferably employed, the PU elastomers are prepared by the prepolymer method in which, advantageously, a polyaddition product containing urethane and isocyanate groups is prepared by the relatively high molecular weight polyhydroxyl compound (a) and at least one aromatic diisocyanate selected from the group consisting of toluene diisocyanate (TDI), MDI, 3,3'-dimethylbiphenyl diisocyanate (TODI), 1,2-diphenylethane diisocyanate (DIBDI), preferably 4,4'-MDI and/or hexamethylene 1,6-diisocyanate (HDI) and/or 1-isocyanto-3,3,5-trimethyl-5-isocyanatomethylcyclohexane (IPDI). This polyaddition product can be reacted with p-PDI, in one step or a little at a time, to convert it into the prepolymer containing isocyanate groups. Microcellular PU elastomers can be prepared from such prepolymers containing isocyanate groups by reaction with water or mixtures of water and, if desired, low molecular weight chain extenders and/or crosslinkers (b) and/or relatively high molecular weight polyhydroxyl compounds (a).

The invention also provides prepolymers containing isocyanate groups, having an NCO content of from 3.3 to 10% by weight, preferably from 3.5 to 9.0% by weight, and prepared by reacting at least one relatively high molecular weight polyhydroxyl compound (a) or a mixture of (a) and at least one low molecular weight chain extender and/or crosslinker (b) with at least one aromatic diisocyanate selected from the group consisting of TDI, MDI, TODI, DIBDI, preferably 4,4'-MDI, and/or HDI and/or IPDI to give a polyaddition product containing urethane and isocyanate groups and having an NCO content of advantageously from 0.05 to 8% by weight, preferably from 1.2–7.5% by weight, and reacting this polyaddition product with p-PDI which can be incorporated into the reaction mixture and reacted with the polyaddition product in one step or preferably a little at a time.

The microcellular PU elastomers have excellent static and dynamic properties. Owing to their specific damping characteristics and long-term use properties, they are used, in particular, in vibration- and shock-damping systems.

Since the ability of the rigid segments comprising urea and/or urethane groups in the PU elastomers based on p-PDI to crystallize is disturbed to a considerable extent by the concomitant use of diisocyanates which crystallize less readily, eg. the inexpensive 4,4'-MDI with its angular structure, a person skilled in the art would have to have assumed that the resulting PU elastomers would have poorer static and dynamic properties than those based on an aromatic diisocyanate.

It was therefore not foreseeable that the microcellular PU elastomers prepared from p-PDI-containing aromatic, aliphatic and/or cycloaliphatic diisocyanate mixtures have good mechanical properties which are virtually comparable with elastomers prepared exclusively from p-PDI and have clearly improved static mechanical properties, in particular compressive sets and dynamic consolidation values compared with microcellular PU elastomers based on 4,4'-MDI. The microcellular PU elastomers prepared by the process of the present invention are thus less expensive than PU elastomers based on 1,5-NDI and, owing to their good static mechanical properties, are very useful for the production of vibration- and shock-damping systems. Furthermore, the reaction mixture is simpler to handle and process.

On the subject of the starting materials (a) to (f) for preparing the compact or preferably cellular, eg. microcellular, PU elastomers and the process of the present invention, the following may be said:

a) Suitable relatively high molecular weight polyhydroxyl compounds advantageously have a functionality of 3 or preferably 2 and a molecular weight of from 500 to 6,000, preferably from 800 to 3,500 and in particular from 1,000 to 3,300 and advantageously comprise hydroxyl-containing polymers, eg. polyacetals such as polyoxymethylenes and especially water-insoluble formals, eg. polybutanediol formal and polyhexanediol formal, polyoxyalkylene polyols, such as polyoxybutylene glycols, polyoxybutylene polyoxyethylene glycols, polyoxybutylene polyoxypropylene glycols, polyoxybutylene polyoxypropylene polyoxyethylene glycols, polyoxypropylene polyols and polyoxypropylene polyoxyethylene polyols, and polyester polyols, eg. polyester polyols prepared from organic dicarboxylic acids and/or dicarboxylic acid derivatives and dihydric to trihydric alcohols and/or dialkylene glycols, from hydroxycarboxylic acids and lactones, and also hydroxyl-containing polycarbonates.

Relatively high molecular weight polyhydroxyl compounds which have been found to be very useful and are therefore preferably used are difunctional polyhydroxyl compounds having molecular weights of from >800 to 3,500, preferably from 1,000 to 3,300, selected from the group consisting of polyester polyols, hydroxyl-containing polycarbonates and polyoxybutylene glycols. The relatively high molecular weight polyhydroxyl compounds can be used individually or as mixtures.

Suitable polyoxyalkylene polyols can be prepared by known methods, for example from one or more alkylene oxides having from 2 to 4 carbon atoms in the alkylene radical by anionic polymerization using alkali metal hydroxides such as sodium or potassium hydroxide, or alkali metal alkoxides such as sodium methoxide, sodium or potassium ethoxide or potassium isopropoxide, as catalysts with addition of at least one initiator molecule containing 2 or 3, preferably 2, reactive hydrogen atoms in bonded form, or by cationic polymerization using Lewis acids such as antimony pentachloride, boron fluoride etherate, etc., or bleaching earth as catalysts.

Suitable alkylene oxides are, for example, 1,3-propylene oxide, 1,2- or 2,3-butylene oxide, preferably ethylene oxide and 1,2-propylene oxide and, in particular, tetrahydrofuran. The alkylene oxides can be used individually, alternately in succession or as a mixture. Examples of suitable initiator molecules are: water, organic dicarboxylic acids such as succinic acid, adipic acid, phthalic acid and terephthalic acid, aliphatic and aromatic, unalkylated, N-monoalkylated and N,N'-dialkylated diamines having from 1 to 4 carbon atoms in the alkyl radical, for example mono-alkylated and dialkylated ethylenediamine, 1,3-propylenediamine, 1,3- or 1,4-butylenediamine, 1,2-, 1,3-, 1,4,1,5- and 1,6-hexamethylenediamine, alkanolamines such as ethanolamine, N-methylethanolamine and N-ethylethanolamine, dialkanolamines such as diethanolamine, N-methyldiethanolamine and N-ethyldiethanolamine, and trialkanolamines such as triethanolamine, and ammonia. Preference is given to using dihydric and/or trihydric alcohols, eg. alkanediols having from 2 to 12 carbon atoms, preferably from 2 to 4 carbon atoms, for example ethanediol, 1,2- and 1,3-propanediol, 1,4-butanediol, 1,5-pentanediol, 1,6-hexanediol, glycerol and trimethylolpropane, and dialkylene glycols such as diethylene glycol and dipropylene glycol.

As polyoxyalkylene polyols, preference is given to using polyoxybutylene glycols (polyoxytetramethylene glycols) having molecular weights of from 500 to 3,000, preferably from 650 to 2,300.

As polyhydroxyl compounds (a), preference is also given to using polyester polyols which can be prepared, for example, from alkanedicarboxylic acids having from 2 to 12 carbon atoms, preferably alkanedicarboxylic acids having from 4 to 6 carbon atoms, and/or aromatic dicarboxylic acids and polyhydric alcohols, preferably alkanediols having from 2 to 12 carbon atoms, preferably 2 to 6 carbon atoms, and/or dialkylene glycols. Examples of suitable alkanedicarboxylic acids are: succinic acid, glutaric acid, adipic acid, suberic acid, azelaic acid, sebacic acid and decanedicarboxylic acid. Suitable aromatic dicarboxylic acids are, for example, phthalic acid, isophthalic acid and terephthalic acid. The alkanedicarboxylic acids can here be used either individually or in admixture with one another. In place of the free dicarboxylic acids, it is also possible to use the corresponding dicarboxylic acid derivatives such as dicarboxylic monoesters or diesters of alcohols having from 1 to 4 carbon atoms or dicarboxylic anhydrides. Preference is given to using dicarboxylic acid mixtures of succinic, glutaric and adipic acid in weight ratios of, for example, 20–35:35–50:20–32, and in particular adipic acid. Examples of dihydric and polyhydric alcohols, in particular alkanediols or dialkylene glycols, are: ethanediol, diethylene glycol, 1,2- or 1,3-propanediol, dipropylene glycol, 1,4-butanediol, 1,5-pentanediol, 1,6-hexanediol, 1,10-decanediol, glycerol and trimethylolpropane. Preference is given to using ethanediol, diethylene glycol, 1,4-butanediol, 1,5-pentanediol, 1,6-hexanediol or mixtures of at least two of the diols mentioned, in particular mixtures of 1,4-butanediol, 1,5-pentanediol and 1,6-hexanediol. It is also possible to use polyester polyols derived from lactones, eg. ε-caprolactone, or hydroxycarboxylic acids, eg. ω-hydroxycaproic acid.

To prepare the polyester polyols, the aromatic and/or aliphatic dicarboxylic acids and preferably alkane dicarboxylic acids and/or derivatives can be polycondensed with polyhydric alcohols in the absence of catalysts of preferably in the presence of esterification catalysts, advantageously in an atmosphere of inert gases such as nitrogen, helium, argon, etc., in the melt at from 150 to 250° C., preferably from 180 to 220° C., at atmospheric pressure or under reduced pressure to the desired acid number which is advantageously less than 10, preferably less than 2. According to a preferred embodiment, the esterification mixture is polycondensed at the abovementioned temperatures to an acid number of from 80 to 30, preferably from 40 to 30, at atmospheric pressure and subsequently under a pressure of less than 500 mbar, preferably from 50 to 150 mbar. Suitable esterification catalysts are, for example, iron, cadmium, cobalt, lead, zinc, antimony, magnesium, titanium and tin catalysts in the form of metals, metal oxides or metal salts. However, the polycondensation can also be carried out in the liquid phase in the presence of diluents and/or entrainers such as benzene, toluene, xylene or chlorobenzene to azeotropically distil off the water of condensation.

To prepare the polyester polyols, the organic polycarboxylic acids and/or derivatives and polyhydric alcohols are advantageously polycondensed in a molar ratio of 1:1–1.8, preferably 1:1.05–1.2.

As polyester polyols, preference is given to using poly (alkanediol adipates) such as poly(ethanediol adipates), poly (1,4-butanediol adipates), poly(ethanediol-1,4-butanediol adipates), poly(1,6-hexanediol-neopentyl glycol adipates) and poly(1,6-hexanediol-1,4-butanediol adipates) and polycaprolactones.

Other suitable polyester polyols which may be mentioned are hydroxyl-containing polycarbonates. Such hydroxyl-containing polycarbonates can be prepared, for example, by reacting the abovementioned alkanediols, in particular 1,4-butanediol and/or 1,6-hexanediol, and/or dialkylene glycols such as diethylene glycol, dipropylene glycol and dibutylene glycol, with dialkyl or diaryl carbonates, eg. diphenyl carbonate, or phosgene.

As hydroxyl-containing polycarbonates, preference is given to using polyether-polycarbonate diols which can be prepared by polycondensation of
 a1) polyoxybutylene glycol having a molecular weight of from 150 to 500 or
 a2) mixtures comprising
  i) at least 10 mol %, preferably from 50 to 95 mol %, of a polyoxybutylene glycol having a molecular weight of from 150 to 500 (a1) and ii) less than 90 mol %, preferably from 5 to 50 mol %, of at least one polyoxyalkylene glycol which is different from (a1) and has a molecular weight of from 150 to 2,000, at least one dialkylene glycol, at least one linear or branched alkanediol having from 2 to 12 carbon atoms and at least one cyclic alkanediol having from 5 to 15 carbon atoms or mixtures thereof with phosgene, diphenyl carbonate or dialkyl carbonates having $C_1$–$C_4$-alkyl groups.

b) To prepare the compact or preferably cellular PU elastomers by the process of the present invention, it is also possible to use low molecular weight difunctional chain extenders (b), low molecular weight, preferably trifunctional or tetrafunctional crosslinkers (b) or mixtures of chain extenders and crosslinkers in addition to the relatively high molecular weight polyhydroxyl compounds (a).

Such chain extenders and crosslinkers (b) are used to modify the mechanical properties, in particular the hardness, of the PU elastomers. Suitable chain extenders such as alkanediols, dialkylene glycols and polyoxyalkylene glycols and crosslinkers, eg. trihydric or tetrahydric alcohols and oligomeric polyoxyalkylene polyols having a functionality of from 3 to 4, usually have molecular weights of less than 800, preferably from 18 to 400 and in particular from 60 to 300. As chain extenders, preference is given to using alkanediols having from 2 to 12 carbon atoms, preferably 2, 4 or 6 carbon atoms, for example ethanediol, 1,3-propanediol, 1,5-pentanediol, 1,6-hexanediol, 1,7-heptanediol, 1,8-octanediol, 1,9-nonanediol, 1,10-decanediol and in particular 1,4-butanediol, and dialkylene glycols having from 4 to 8 carbon atoms, for example diethylene glycol and dipropylene glycol, and also polyoxyalkylene glycols. However, suitable chain extenders also include branched-chain and/or unsaturated alkanediols having usually not more than 12 carbon atoms, eg. 1,2-propanediol, 2-methylpropane-1,3-diol, 2,2-dimethylpropane-1,3-diol, 2-butyl-2-ethylpropane-1,3-diol, but-2-ene-1,4-diol and but-2-yne-1,4-diol, diesters of terephthalic acid with glycols having from 2 to 4 carbon atoms, eg. bis(ethylene glycol) terephthalate or bis(1,4-butanediol) terephthalate, hydroxyalkylene ethers of hydroquinone or resorcinol, eg. 1,4-di(β-hydroxyethyl) hydroquinone or 1,3-di-(β-hydroxyethyl)resorcinol, alkanolamines having from 2 to 12 carbon atoms, eg. ethanolamine, 2-aminopropanol and 3-amino-2,2-dimethylpropanol, N-alkyldialkanolamines, such as N-methyldiethanolamine and N-ethyldiethanolamine, (cyclo)aliphatic diamines having from 2 to 15 carbon atoms, eg. ethylene diamine, 1,2- or 1,3-propylenediamine, 1,4-butylenediamine and 1,6-hexamethylenediamine, isophoronediamine, 1,4-cyclohexylenediamine and 4,4'-diamino-dicyclohexylmethane, N-alkyl- and N,N'-dialkylalkylenediamines such as N-methylpropylenediamine and N,N'-dimethylethylenediamine and aromatic diamines such as the dimethyl ester of methylenebis(4-amino-3-benzoic acid), 1,2-bis(2-aminophenylthio)ethane, trimethyleneglycol-di-p-aminobenzoate, 2,4- and 2,6-toluenediamine, 3,5-diethyl-2, 4- and -2,6-toluenediamine, 4,4'-diaminodiphenylmethane, 3,3'-dichloro-4,4'-diaminodiphenylmethane and primary ortho-di-, -tri- and/or -tetraalkyl-substituted 4,4'-diaminodiphenylmethanes, such as 3,3'-diisopropyl- and 3,3',5,5'-tetraisopropyl-4,4'-diaminodiphenylmethane.

Examples of at least trifunctional crosslinkers which are advantageously used in the preparation of the PU casting elastomers are: trifunctional and tetrafunctional alcohols such as glycerol, trimethylolpropane, pentaerythritol and trihydroxycyclohexanes and tetrahydroxyalkylalkylenediamines such as tetra(2-hydroxyethyl)ethylenediamine or tetra(2-hydroxypropyl)ethylenediamine and also oligomeric polyoxyalkylene polyols having a functionality of from 3 to 4.

The chain extenders and crosslinkers (b) which are suitable according to the present invention can be used individually or in the form of mixtures. It is also possible to use mixtures of chain extenders and crosslinkers.

To adjust the hardness of the PU elastomers, the ratios of the formative components (a) and (b) can be varied over a relatively wide range, with the hardness rising with increasing content of difunctional chain extenders and at least trifunctional crosslinkers in the PU elastomer.

Depending on the desired hardness, the required amounts of the formative components (a) and (b) can be experimentally determined in a simple manner. It is advantageous to use, based on the weight of the relatively high molecular weight polyhydroxyl compound (a), from 5 to 50% by weight of the chain extender and/or crosslinker (b), with preference being given to using from 30 to 50% by weight for preparing rigid PU elastomers.

c) According to the present invention, the compact and preferably microcellular PU elastomers are prepared using two organic polyisocyanates of which one is p-PDI. Aromatic diisocyanates different from p-PDI which are used are toluene diisocyanates, eg. 2,4- and 2,6-TDI and commercial mixtures, diphenylmethane diisocyanates, eg. 2,4'-, 2,2'- and preferably 4,4'-MDI and mixtures of at least two of the MDI-isomers mentioned, 3,3'-dimethylbiphenyl diisocyanates, eg. 3,3'-dimethyl-4,4'-diisocyanatobiphenyl (TODI), 1,2-diphenylethane diisocyanates, eg. 2,4'-, 2,2'- and preferably 4,4'-DIBDI and mixtures of at least two of the DIBDI isomers mentioned. Owing to its good processability and the very good mechanical properties of the elastomers achievable therewith, 4,4'-MDI is particularly preferably used in combination with p-PDI for preparing the compact and preferably microcellular PU elastomers. The molar ratio of p-PDI to the aromatic diisocyanates selected from the group consisting of TDI, MDI, TODI and DIBDI can be varied over a wide range, eg. p-PDI to aromatic diisocyanates of from 1:0.1 to 1:10, preferably from 1:0.11 to 1:9 and in particular from 1:1 to 1:4, without the static and dynamic properties changing significantly. When using p-PDI and 4,4'-MDI, the preferred combination, the p-PDI/4,4'-MDI-molar ratio is advantageously in the range from 1:0.1 to 1:10, preferably from 1:0.11 to 1:9 and in particular from 1:1 to 1:4. The aromatic diisocyanates can, if required, be melted individually and mixed or mixed and melted together and used as melt for preparing the PU elastomers, or the solid diisocyanate can be introduced into the melt of the other diisocyanate and melted and dissolved therein. According to the last-named process variant, solid p-PDI (melting point: 94° C.) is usually introduced into a 4,4'-MDI-melt and dissolved with melting.

In place of the aromatic diisocyanates or in admixture with these, it is also possible to prepare the compact and preferably cellular PU elastomers using aliphatic diisocyanates having from 4 to 12 carbon atoms, preferably from 4 to 6 carbon atoms, in the branched-chain or preferably linear alkylene radical and/or cycloaliphatic diisocyanates having from 6 to 18 carbon atoms, preferably from 6 to 10 carbon atoms, in the unsubstituted or alkyl-substituted cycloalkylene radical. Examples of aliphatic diisocyanates which may be mentioned are dodecane 1,12-diisocyanate, 2-ethylbutane 1,4-diisocyanate, 2-methylpentane 1,5-diisocyanate, butane 1,4-diisocyanate and preferably hexamethylene 1,6-diisocyanate (HDI). Examples of suitable cycloaliphatic diisocyanates are: cyclohexane 1,3- and 1,4-diisocyanate, hexahydrotoluene 2,4- and 2,6-diisocyanate, dicyclohexylmethane 4,4'-, 2,4'- and 2,2'-diisocyanate and preferably 1-isocyanato-3,3,5-trimethyl-5-isocyanatomethylcyclohexane (isophorone diisocyanate, IPDI).

However, preference is given to embodiments in which the organic polyisocyanates (c) can be used in the form of a prepolymer containing isocyanate groups. These can be prepared, for example, by reacting the p-PDI-containing diisocyanate melt with at least one relatively high molecular weight polyhydroxyl compound (a) or a mixture of (a) and at least one low molecular weight chain extender and/or at least one crosslinker (b) or by stagewise reaction of the p-PDI-containing diisocyanate melt with at least one relatively high molecular weight polyhydroxyl compound (a) and subsequently with at least one chain extender and/or crosslinker.

However, preference is given to prepolymers containing isocyanate groups and prepared by reacting a partial amount or the total amount of at least one relatively high molecular weight polyhydroxyl compound (a) or a partial amount or the total amount of the mixture of (a) and at least one low molecular weight chain extender and/or crosslinker (b) with at least one aromatic diisocyanate selected from the group consisting of TDI, MDI, TODI, DIBDI, preferably 4,4'-MDI and/or HDI and/or IPDI to give a polyaddition product containing urethane groups, preferably urethane and isocyanate groups, and having an NCO content of from 0.05 to 8.0% by weight, preferably from 1.2 to 7.5% by weight, and reacting this polyaddition product with p-PDI to give the prepolymer containing isocyanate groups.

To prepare the polyaddition products containing urethane and isocyanate groups, the formative components (a), if desired (b) and (c) are advantageously used in such amounts that the equivalence ratio of the hydroxyl groups of (a) or (a) and (b) to isocyanate groups of the aromatic diisocyanates TDI, MDI, TODI, DIBDI, preferably 4,4'-MDI and/or HDI and/or IPDI is 1:>1–6, preferably 1:1.01–4. The polyaddition products containing urethane and isocyanate groups are then reacted with p-PDI in one step or preferably a little at a time in a plurality of steps, preferably, for example, in 2 steps, to convert them into the prepolymers containing isocyanate groups, with the p-PDI being used in such an amount that the equivalence ratio of the hydroxyl groups of (a) or (a) and (b) to isocyanate groups of p-PDI is 1:0.02–6, preferably 1:0.1–5 and in particular 1:0.2–3.

As already indicated, mixtures of (a) and (b) can be used for preparing the prepolymers containing isocyanate groups. However, according to a preferred embodiment, the prepolymers containing isocyanate groups are prepared by reacting exclusively relatively high molecular weight polyhydroxyl compounds (a) with the polyisocyanates (c), preferably with 4,4'-MDI and p-PDI. Polyhydroxyl compounds which are particularly suitable for this purpose are difunctional polyhydroxyl compounds having a molecular weight of from 500 to 6,000, preferably from >800 to 3,500 and in particular from 1,000 to 3,300, which are selected from the group consisting of polyester polyols, hydroxyl-containing polycarbonates and polyoxytetramethylene glycols.

When using 4,4'-MDI and p-PDI as aromatic diisocyanates, equivalence ratios of the hydroxyl groups of (a) and (b), preferably exclusively (a), to NCO groups of the 4,4'-MDI to NCO groups of the p-PDI of 1:>1–6:0.02–6 have been found to be useful.

The prepolymers containing isocyanate groups which can be used according to the present invention and are preferably prepared by the abovementioned process variants preferably have isocyanate contents of from 3.3 to 10% by weight, preferably from 3.5 to 9% by weight, based on their total weight.

To prepare the prepolymers containing isocyanate groups, the relatively high molecular weight polyhydroxyl compounds (a) or mixtures of (a) and low molecular weight chain extenders and/or crosslinkers (b) can be reacted with the organic polyisocyanates (c), for example, in the form of a p-PDI-containing aromatic diisocyanate mixture or preferably in stages, using first at least one aromatic diisocyanate selected from the group consisting of TDI, MDI, TODI, DIBDI, preferably 4,4'-MDI and then p-PDI, at from 80 to 160° C., preferably from 90 to 150° C.

Thus, for example, the total amount or if desired partial amounts of p-PDI can be dissolved in an aromatic diisocyanate, preferably 4,4'-MDI, heated to, for example, 110° C. and the polyhydroxyl compound (a) and, if desired, chain extenders and/or crosslinkers (b) heated to, for example, 125° C. can be added to the isocyanate mixture. After going through the maximum reaction temperature, which is usually in the range from 130 to 150° C., any remaining partial amounts of p-PDI can be added and reacted during the cooling phase, eg. at from 90 to 130° C.

According to another process variant which is preferably employed, the component (a) or a mixture of (a) and (b) can be heated, for example, to 140° C. and at this temperature, for example, the aromatic diisocyanate, preferably the total amount of the 4,4'-MDI heated to 50° C., can be added. Immediately after the addition of the 4,4'-MDI, all of the p-PDI can be incorporated or partial amounts of p-PDI can be added a little at a time, with it having been found to be advantageous to add a partial amount of p-PDI immediately after the addition of 4,4'-MDI- and incorporate the other partial amount(s) into the reaction mixture during the cooling phase.

After reaching the theoretically calculated isocyanate content, the reaction is ended. This usually requires reaction times in the range from 10 to 200 minutes, preferably from 15 to 150 minutes.

The prepolymers containing isocyanate groups can be prepared in the presence of catalysts. However, it is also possible to prepare the prepolymers containing isocyanate groups in the absence of catalysts and to incorporate the latter into the reaction mixture for preparing the PU-elastomers.

d) Catalysts (d) used are advantageously compounds which strongly accelerate the reaction of the hydroxyl-containing compounds of the component (a) and, if desired, (b) with the polyisocyanates (c). Suitable catalysts are organic metal compounds, preferably organic tin compounds such as tin(II) salts of organic carboxylic acids, eg. tin(II) acetate, tin(II) octoate, tin(II) ethylhexanoate and tin(II) laurate and the dialkyltin(IV) salts of organic carboxylic acids, eg. dibutyltin diacetate, dibutyltin dilaurate, dibutyltin maleate and dioctyltin diacetate. The organic metal compounds are used alone or preferably in combination with strongly basic amines. Examples which may be mentioned are amidines such as 2,3-dimethyl-3,4,5,6-tetrahydropyrimidine, tertiary amines such as triethylamine, tributylamine, dimethylbenzylamine, N-methylmorpholine, N-ethylmorpholine, N-cyclohexylmorpholine, N,N,N',N'-tetraalkylalkylenediamines, such as N,N,N',N'-tetramethylethylenediamine, N,N,N',N'-tetramethylbutanediamine or N,N,N',N'- tetramethylhexanediamine, pentamethyldiethylenetriamine, bis(dimethylaminoethyl)ether, bis(dimethylaminopropyl) urea, 1,4-dimethylpiperazine, 1,2-dimethylimidazol, 1-azabicyclo[3.3.0]octane and preferably 1,4-diazabicyclo [2.2.2]octane and alkanolamine compounds such as triethanolamine, triisopropanolamine, N-methyldiethanolamine and N-ethyldiethanolamine and dimethylethanolamine. Preference is given to using from 0.001 to 3% by weight, in particular from 0.01 to 1% by weight, of catalyst or catalyst combination, based on the weight of the formative components (a), (c) and, if used, (b).

e) Compact PU elastomers such as PU casting elastomers can be prepared by the process of the present invention in the absence of moisture and of physically or chemically active blowing agents. However, the process is preferably employed for preparing cellular, preferably microcellular, PU elastomers. For this purpose, water is used as blowing agent (e). The water reacts with the organic polyisocyanates and preferably prepolymers containing isocyanate groups (a) in situ to form carbon dioxide and amino groups which in turn react further with the isocyanate prepolymers to form urea groups and thus act as chain extenders.

Since the formative components (a) and, if used, (b) can, owing to their preparation and/or chemical composition, contain water, in some cases there is no need for a separate water addition to the formative components (a) and, if used, (b) or the reaction mixture. However, if water has to be additionally incorporated into the polyurethane formulation to achieve the desired bulk density, this is usually used in amounts of from 0.001 to 3.0% by weight, preferably from 0.01 to 2.0% by weight and in particular from 0.2 to 1.2% by weight, based on the weight of the formative components (a) to (c).

As blowing agents (e), it is also possible to use, in place of water or preferably in combination with water, low-boiling liquids which vaporize under the action of the exothermic polyaddition reaction and advantageously have a boiling point at atmospheric pressure in the range from −40 to 120° C., preferably from 10 to 90° C., or gases as physically acting blowing agents or chemically acting blowing agents.

The liquids of the abovementioned type and gases suitable as blowing agents can be selected, for example, from the group consisting of alkanes such as propane, n- and iso-butane, n- and iso-pentane and preferably industrial pentane mixtures, cycloalkanes and cycloalkenes such as cyclobutane, cyclopentene, cyclohexene and preferably cyclopentane and/or cyclohexane, dialkyl ethers, such as dimethyl ether, methyl ethyl ether or diethyl ether, tert-butyl methyl ether, cycloalkylene ethers, such as furan, ketones such as acetone, methyl ethyl ketone, acetals and/or ketals, such as formaldehyde dimethyl acetal, 1,3-dioxolane and acetone dimethyl acetal, carboxylic esters such as ethyl acetate, methyl formate and the tertiary butyl ester of ethyleneacrylic acid, tertiary alcohols such as tertiarybutanol, fluoroalkanes which are degraded in the troposphere and therefore do not damage the ozone layer, eg. trifluoromethane, difluoromethane, difluoroethane, tetrafluoroethane and heptafluoroethane, chloroalkanes such as 2-chloropropane, and gases such as nitrogen, carbon monoxide and noble gases such as helium, neon and krypton and blowing agents which act chemically in a manner similar to water, for example carboxylic acids such as formic acid, acetic acid and propionic acid.

Among the liquids which are inert toward NCO groups and are suitable as blowing agents (e), preference is given to using alkanes having from 4 to 8 carbon atoms, cycloalkanes having from 4 to 6 carbon atoms or alkane/cycloalkane mixtures having a boiling point of from −40 to 50° C. at atmospheric pressure. Particular preference is given to using $C_5$-(cyclo)alkanes such as n-pentane, iso-pentanes and cyclopentane and their industrial mixtures.

Other suitable blowing agents are salts which decompose on heating, eg. ammonium bicarbonate, ammonium carbamate and/or ammonium salts of organic carboxylic acids, eg. the monoammonium salts of malonic acid, boric acid, formic acid or acetic acid.

The most appropriate amount of solid blowing agents, low-boiling liquids and gases, which can each be used individually or in the form of mixtures, eg. as liquid or gas mixtures or as gas/liquid mixtures, depends on the density which is to be achieved and on the amount of water present. The amounts required can be easily determined by simple experiments. Satisfactory results are usually given by amounts of solids of from 0.5 to 35 parts by weight, preferably from 2 to 15 parts by weight, amounts of liquids of from 1 to 30 parts by weight, preferably from 3 to 18 parts by weight, and/or amounts of gases of from 0.01 to 80 parts by weight, preferably from 10 to 35 parts by weight, in each case based on the weight of the formative components (a), (c) and, if used, (b). The gas loading with, for example, air, carbon dioxide, nitrogen and/or helium can be carried out either via the low molecular weight chain extenders and/or crosslinkers (b) or via the polyisocyanates (c) or via (a) and (c) and, if used, (b).

Blowing agents which are not employed are, as already indicated, perhalogenated chlorofluorocarbons.

f) If desired, additives (f) can also be incorporated into the reaction mixture for preparing the compact and preferably cellular PU elastomers. Examples which may be mentioned are surface-active substances, foam stabilizers, cell regulators, fillers, flame retardants, nucleating agents, oxidation inhibitors, stabilizers, lubricants and mold release agents, dyes and pigments.

Possible surface-active substances are, for example, compounds which serve to aid the homogenization of the starting materials and may also be suitable for regulating the cell structure. Examples which may be mentioned are emulsifiers such as the sodium salts of castor oil sulfates or of fatty acids and also amine salts of fatty acids, eg. diethylamine oleate, diethanolamine stearate, diethanolamine ricinoleate, salts or sulfonic acids, eg. alkali metal or ammonium salts of dodecylbenzene- or dinaphthylmethanedisulfonic acid and ricinoleic acid; foam stabilizers such as siloxane-oxalkylene copolymers and other organopolysiloxanes, ethoxylated alkylphenols, ethoxylated fatty alcohols, paraffin oils, castor oil esters or ricinoleic esters, Turkey red oil and peanut oil and cell regulators such as paraffins, fatty alcohols and dimethylpolysiloxanes. Also suitable for improving the emulsifying action, the cell structure and/or its stabilization are oligomeric polyacrylates having polyoxyalkylene and fluoroalkane radicals as side groups. The surface-active substances are usually employed in amounts of from 0.01 to 5 parts by weight, based on 100 parts by weight of the relatively high molecular weight polyhydroxyl compounds (a).

For the purposes of the present invention, fillers, in particular reinforcing fillers, are the customary organic and inorganic fillers, reinforcers and weighting agents known per se. Specific examples are: inorganic fillers such as siliceous minerals, for example sheet silicates such as antigorite, serpentine, hornblends, amphiboles, chrysotile, talc; metal oxides such as kaolin, aluminum oxides, aluminum silicate, titanium oxides and iron oxides, metal salts such as chalk, barite and inorganic pigments such as cadmium sulfide, zinc sulfide and also glass particles. Examples of suitable organic fillers are: carbon black, melamine, expanded graphite, rosin, cyclopentadienyl resins and graft polymers.

As reinforcing fillers, preference is given to using fibers, for example carbon fibers or in particular glass fibers, particularly when a high heat distortion resistance or very high stiffness is required. These fibers can be coated with coupling agents and/or sizes. Suitable glass fibers, which may also, for example, be used in the form of glass fabrics, mats, nonwovens and/or preferably fiberglass rovings or chopped fiberglass of low-alkali E glasses having a diameter of from 5 to 200 μm, preferably from 6 to 15 μm, generally have a mean fiber length of from 0.05 to 1 mm, preferably from 0.1 to 0.5 mm, after incorporation into the molding compositions.

The inorganic and organic fillers can be used individually or as mixtures and are usually incorporated into the reaction mixture in amounts of from 0.5 to 50% by weight, preferably from 1 to 30% by weight, based on the weight of the formative components (a) to (c).

Suitable flame retardants are, for example, tricresyl phosphate, tris(2-chloroethyl)phosphate, tris(2-chloropropyl)phosphate, tris(1,3-dichloropropyl)phosphate, tris-(2,3-dibromopropyl)phosphate and tetrakis(2-chloroethyl)ethylene diphosphate.

Apart from the halogen-substituted phosphates mentioned above, it is also possible to use inorganic flame retardants such as red phosphorus, hydrated aluminum oxide, antimony trioxide, arsenic trioxide, ammonium polyphosphate and calcium sulfate or cyanuric acid derivatives such as melamine or mixtures of at least two flame retardants such as ammonium polyphosphates and melamine and, if desired, starch and/or expanded graphite for making the PU elastomers prepared according to the present invention flame resistant. In general, it has been found to be advantageous to use from 5 to 50 parts by weight, preferably from 5 to 25 parts by weight, of said flame retardants or mixtures per 100 parts by weight of the formative components (a) to (c).

Nucleating agents which can be used are, for example, talc, calcium fluoride, sodium phenylphosphinate, aluminum oxide and finely divided polytetrafluoroethylene in amounts of up to 5%, based on the total weight of the formative components (a) to (c).

Suitable oxidation inhibitors and heat stabilizers which can be added to the PU elastomers of the present invention are, for example, halides of metals of group I of the Periodic Table, eg. sodium, potassium, lithium halides, if desired in combination with copper(I) halides, eg. chlorides, bromides or iodides, sterically hindered phenols, hydroquinones, and also substituted compounds of these groups and mixtures thereof, which are preferably used in a concentration of up to 1% by weight, based on the weight of the formative components (a) to (c).

Examples of UV stabilizers are various substituted resorcinols, salicylates, benzotriazoles and benzophenones and also sterically hindered amines which are generally used in amounts of up to 2.0% by weight, based on the weight of the formative components (a) to (c).

Lubricants and mold release agents, which are generally likewise added in amounts of up to 1% by weight, based on the weight of the formative components (a) to (c), are stearic acid, stearyl alcohol, stearic esters and stearamides and also the fatty acid esters of pentaerythritol.

It is also possible to add organic dyes such as nigrosine, or pigments such as titanium dioxide, cadmium sulfide, cadmium sulfide selenide, phthalocyanines, ultramarine blue or carbon black.

More detailed information about the abovementioned other customary auxiliaries and additives may be found in the specialist literature, for example the monograph by J. H. Saunders and K. C. Frisch "High Polymers", Volume XVI, Polyurethanes, Parts 1 and 2, Interscience Publishers 1962 or 1964, or the Kunststoff-Handbuch, Polyurethane, Volume VII, Carl-Hanser-Verlag, Munich, Vienna, 1st, 2nd and 3rd edition, 1966, 1983 and 1993.

To prepare the compact or preferably cellular PU elastomers, the relatively high molecular weight polyhydroxyl compounds (a), if desired low molecular weight chain extenders and/or crosslinkers (b) and, if desired, the chemically acting blowing agents, preferably water, and organic polyisocyanates (c) or preferably the prepolymers containing isocyanate groups and prepared from (a), (b) and (c) or preferably from (a) and (c) and chain extenders and/or crosslinkers (b), mixtures of partial amounts of (a) and (b), mixtures of partial amounts of (a), (b) and water or preferably mixtures of (b) and water or water can be reacted in the presence or absence of catalysts (d), physically acting blowing agents (e) and additives (f) in such amounts that the equivalence ratio of NCO groups of the polyisocyanates (c) or prepolymers containing isocyanate groups to the sum of the reactive hydrogens of the components (a) and, if used (b) and any chemically acting blowing agents is 0.8–1.2:1, preferably 0.95–1.15:1 and in particular 1.00–1.05:1.

The compact or preferably cellular PU elastomers can be prepared by the methods described in the literature, eg. the one-shot or preferably prepolymer process, with the aid of known mixing equipment.

To prepare the compact PU elastomers, the starting components can be homogeneously mixed in the absence of blowing agents (e), usually at from 80 to 160° C., preferably from 110 to 150° C., and the reaction mixture can be introduced into an open, heated or unheated mold and allowed to cure. To form cellular PU elastomers, the formative components can be mixed in the same way in the presence of a blowing agent, preferably water, and placed in the heated or unheated mold. After filling the mold, the mold is closed and the reaction mixture is allowed to foam with compaction, eg. at a degree of compaction of from 1.1 to 8, preferably from 1.2 to 6 and in particular from 2 to 4, to form moldings. As soon as the moldings have sufficient strength, they are removed from the mold. The demolding times are dependent, inter alia, on the mold temperature, mold geometry and the reactivity of the reaction mixture and are usually in a range from 10 to 60 minutes.

The compact PU elastomers prepared by the process of the present invention have, without filler, a density of from 1.0 to 1.4 g/cm$^3$, preferably from 1.1 to 1.25 g/cm$^3$, while filler-containing products usually have a density of greater than 1.2 g/cm$^3$. The cellular PU elastomers have densities of from 0.2 to 1.1 g/cm$^3$, preferably from 0.35 to 0.80 g/cm$^3$.

The PU elastomers prepared by the process of the present invention are used for producing moldings, preferably for machine construction and the vehicle sector. The cellular PU elastomers are suitable, in particular, for producing damping and spring elements, eg. for vehicles, preferably motor vehicles, buffers and covering layers.

EXAMPLES

Comparative Example I

Preparation of a Prepolymer Containing Isocyanate Groups and Based on 1,5-NDI 1.000 parts by weight (0.5 mol) of a poly(ethanediol(0.5 mol)-1,4-butanediol(0.5 mol) adipate(1 mol)) having an average molecular weight of 2,000 (calculated from the experimentally determined hydroxyl number) were heated to 140° C. and at this temperature admixed and reacted while stirring vigorously with 240 parts by weight (1.14 mol) of solid 1,5-NDI.

This gave a prepolymer having an NCO content of 4.32% by weight and a viscosity at 90° C. of 2,800 mPa.s (measured using a rotation viscometer from Haake, by means of which the viscosities in the following comparative examples and examples were also measured).

b) Production of Cellular Moldings

The crosslinker component comprised 20,7 parts by weight of 2,2',6,6'-tetraisopropyldiphenylcarbodiimide, 2,9 parts by weight of a mixture of ethoxylated oleic and ricinoleic acid containing an average of 9 oxyethylene units, 3,8 parts by weight of the monoethanolamine salt of n-alkylbenzenesulfonic acid containing $C_9$–$C_{15}$-alkyl radicals, 36,3 parts by weight of the sodium salt of sulfated castor oil, 36,3 parts by weight of water and 0,03 parts by weight of a mixture of 30% by weight of pentamethyldiethylenetriamine and 70% by weight of N-methyl-N'-(dimethylaminomethyl)piperazine.

100 parts by weight of the isocyanate prepolymer prepared as described in Comparative Example Ia and heated to 90° C. were stirred vigorously with 2.4 parts by weight of the crosslinker component for about 8 seconds. The reaction mixture was then introduced into a closable, metallic mold heated to 80° C., the mold was closed and the reaction mixture was allowed to cure. After 25 minutes, the microcellular molding was removed from the mold and heated at 110° C. for 16 hours for further thermal curing.

Comparative Example II a) Preparation of a Prepolymer Containing Isocyanate Groups and Based on 4,4'-MDI The procedure of Comparative Example Ia was repeated, but using 380 parts by weight (1.52 mol) of 4,4'-MDI heated to 50° C. in place of the 1,5-NDI.

This gave a prepolymer having an NCO content of 6.19% by weight and a viscosity at 90° C. of 1,600 mPa.s (measured using a rotation viscometer).

b) Production of a Cellular Test Plate 100 parts by weight of the prepolymer as described in Comparative Example IIa and 3.42 parts by weight of the crosslinker component as described in Comparative Example Ib were reacted as described in Comparative Example I and the reaction mixture was molded to form test plates. The reaction mixture could not be processed into test springs for the dynamic test.

Comparative Example III a) Preparation of a Prepolymer Containing Isocyanate Groups and Based on 4,4'-MDI A mixture of 1,000 parts by weight of the poly(ethanediol-1,4-butanediol adipate) described in Comparative Example I and 3 parts by weight of trimethylolpropane were reacted with 380 parts by weight (1.52 mol) of 4,4'-MDI heated to 50° C. as described in Comparative Example II.

This gave a prepolymer having an NCO content of 5.80% by weight and a viscosity at 90° C. of 1,750 mPa.s (measured using a rotation viscometer).

b) Production of Cellular Moldings

Moldings were produced by a method similar to that described in Comparative Example I from 100 parts by weight of the prepolymer as described in Comparative Example IIIa and 3.1 parts by weight of the crosslinker component as described in Comparative Example Ib.

Comparative Example IV a) Preparation of a Prepolymer Containing Isocyanate Groups and Based on p-PDI 1000 parts by weight (0.5 mol) of a poly(ethanediol(0.5 mol)-1,4-butanediol(0.5 mol) adipate(1 mol)) having an average molecular weight of 2000 (calculated from the experimentally determined hydroxyl number) were heated to 100° C. and at this temperature admixed and reacted while stirring vigorously with 183 parts by weight (1.14 mol) of solid p-PDI.

This gave a prepolymer having an NCO content of 4.40% by weight and a viscosity at 80° C. of 2900 mPas (measured using a rotation viscometer).

b) Production of Cellular Moldings

Moldings were produced by a method similar to that described in Comparative Example I from 100 parts by weight of the prepolymer as described in Comparative Example IVa and 2.43 parts by weight of the crosslinker component as described in Comparative Example Ib, but the isocyanate prepolymer from Comparative Example IVa was heated to 80° C. The moldings were only removed from the mold after 60 minutes and were heated at 110° C. for 16 hours for further thermal curing.

Example 1 a) Preparation of a Prepolymer Containing Isocyanate Groups and Based on 4,4'-MDI/p-PDI 1000 parts by weight (0.5 mol) of a poly(ethanediol(0.5 mol)-1,4-butanediol(0.5 mol) adipate(1 mol)) having an average molecular weight of 2000 (calculated from the experimentally determined hydroxyl number) were heated to 130° C. and, while stirring vigorously, 174 parts by weight (0.696 mol) of 4,4'-MDI heated to 50° C. and immediately thereafter 55.75 parts by weight (0.348 mol) of solid p-PDI were added thereto. This gave, after a reaction time of about 15 minutes, a polyaddition product containing urethane and isocyanate groups and having an NCO content of 3.7% by weight. This polyaddition product was reacted at 97° C. with an additional 55.75 parts by weight (0.348 mol) of solid p-PDI and was cooled to 80° C. over about 30 minutes while stirring.

This gave a prepolymer having an NCO content of 5.77% and a viscosity at 80° C. of 3000 mPas (measured using a rotation viscometer).

b) Production of Cellular Moldings 100 parts by weight of the isocyanate prepolymer based on 4,4'-MDI/p-PDI and heated to 80° C., prepared as described in Example 1a, were mixed while stirring vigorously with 3.21 parts by weight of the crosslinker component, prepared as described in Comparative Example Ib.

After a stirring time of about 8 seconds, the reaction mixture was introduced into a closable metallic mold heated to 80° C., the mold was closed and the reaction mixture was allowed to cure. After 60 minutes, the microcellular molding was removed from the mold and heated at 110° C. for 16 hours for further thermal curing.

Example 2 a) Preparation of a Prepolymer Containing Isocyanate Groups and Based on 4,4'-MDI/p-PDI The procedure of Example 1 was repeated, but the 1000 parts by weight (0.5 mol) of the poly(ethanediol-1,4-butanediol adipate) were admixed first with 174 parts by weight (0.696 mol) of 4,4'-MDI and immediately thereafter with 111.5 parts by weight (0.696 mol) of p-PDI.

A reaction time of about 60 minutes in a temperature range of 130–90° C. gave a prepolymer having an NCO content of 5.70% by weight and a viscosity at 80° C. of 3000 mPas (measured using a rotation viscometer).

b) Production of Cellular Moldings

The cellular moldings were produced by a method similar to that described in Example Ib using the prepolymer as described in Example 2a.

The static and dynamic mechanical properties of the microcellular PU elastomers were measured on the cellular moldings produced as described in Comparative Examples Ib to IVb and Examples 1 and 2.

The static mechanical properties measured were the tensile strength in accordance with DIN 53 571, the elongation at break in accordance with DIN 53 571, the tear propagation resistance in accordance with DIN 53 515 and the compressive set at 80° C. by a modification of DIN 53 572 using spacers 18 mm high and test specimens having a base area of 40×40 mm and a height of 30±1 mm. The compressive set (CS) was calculated according to the equation $$CS = \frac{H_0 - H_2}{H_0 - H_1} \cdot 100 \quad [\%]$$

where $H_0$ is the original height of the test specimen in mm,
$H_1$ is the height of the test specimen in the deformed state in mm and $H_2$ is the height of the test specimen after release of the pressure in mm.

The dynamic mechanical properties determined are the displacement increase (DI) under the action of maximum force and the consolidation (CON) (Figure). The molding for measuring the consolidation was a cylindrical test spring having 3 segment constrictions and a height of 100 mm, an external diameter of 50 mm and an internal diameter of 10 mm. After stressing the spring over 100,000 load cycles at a force of 6 kN and a frequency of 1.2 Hz, the CON is measured as the difference between initial and final values of the test spring height and given in percent. The consolidation is a measure of the permanent deformation of the cellular PU elastomer during the long-term vibration test. The smaller the consolidation, the greater is the dynamic performance capability of the material.

The height $H_R$ for determining the consolidation after the dynamic test is determined after recording the characteristic curve of the spring: $H_0$ is the initial height; the molding is precompressed 3 times under maximum force (maximum force as per characteristic curves), then the characteristic curve is recorded in a 4th cycle at a compression rate of V=50 mm/min. After 10 minutes, $H_1$, viz. the height of the component after recording the characteristic curve, is determined. Only then is the dynamic test commenced.

$H_R$=Final height after the dynamic test measured after storage for 24 hours at 23° C./50% relative atmospheric humidity after the end of the dynamic test. However, the reference point (=initial height) used for determining the permanent consolidation after the dynamic test is $H_0$, the height of the spring in the completely "new" state, without any compression:

$$CON = \frac{H_0 - H_R}{H_o} \times 100 \quad [\%]$$

The dynamic test is carried out without additional cooling in an air-conditioned room at 23° C. and 50% relative atmospheric humidity. The mechanical properties measured on the test specimens are summarized in the table below.

TABLE

Static and dynamic mechanical properties of the cellular PU-elastomers prepared as described in Comparative Examples I to IV and Examples 1 and 2

| Example Comparative Example | I | II | III | IV | 1 | 2 |
|---|---|---|---|---|---|---|
| Diisocyanate basis of isocyanate prepolymer | NDI | MDI | MDI | p-PDI | MDI/p-PDI | MDI/p-PDI |
| NCO content [%] | 4.32 | 6.19 | 5.8 | 4.40 | 5.77 | 5.70 |
| Viscosity at 90° C. [mPa's] | 2800 | 1600 | 1750 | 2900 (80° C.) | 3000 (80° C.) | 3000 (80° C.) |
| Static mechanical properties | | | | | | |
| Compressive set [80° C.,%] | 20 | 43 | 20 | 17 | 20 | 22 |
| Tensile strength [N/mm²] | 3.6 | 4.5 | 4.3 | 4.1 | 4.5 | 4.6 |
| Elongation [%] | 350 | 510 | 460 | 630 | 600 | 610 |
| Tear propagation resistance [N/mm] | 16.2 | 19.9 | 17.3 | 17.4 | 17.5 | 17.3 |
| Dynamic mechanical properties | | | | | | |
| Consolidation [%] | 8 | — | 16–18 | 6.2–7.2 | 12 | 11.7 |
| Displacement increase [mm] | 1.4–2.1 | — | 5.0–5.7 | 1.8–2.1 | 3.0 | 2.9 |

What is claimed is:

1. A process for the preparation of a polyurethane elastomer comprising the steps of:
   a) reacting a first polyhydroxyl compound having a functionality of from 2 to 3 and a molecular weight of from 800 to 6000 and, optionally, a chain extender or crosslinker having a molecular weight of up to 800 with an organic diisocyanate selected from the group consisting of toluene diisocyanate, diphenylmethane diisocyanate, 3,3'-dimethylbiphenyl diisocyanate, 1,2-diphenylmethane diisocyanate, aliphatic diisocyanates having from 4 to 12 carbon atoms, cycloaliphatic diisocyanates having from 6 to 18 carbon atoms and mixtures thereof, to form a polyaddition product, wherein the equivalence ratio of hydroxyl groups in the polyhydroxyl compounds and optional chain extenders or crosslinkers to the isocyanate groups in the organic diisocyanate is 1:>1–6;

b) reacting the polyaddition product with 1,4-phenylene diisocyanate to form a polyisocyanate prepolymer, wherein the equivalence ratio of the hydroxyl groups in the polyhydroxyl compounds and optional chain extenders or crosslinkers to isocyanate groups in the 1,4-phenylene diisocyanate is 1:0.02–6; and c) reacting the polyisocyanate prepolymer with a second polyhydroxyl compound having a functionality of from 2 to 3 and a molecular weight of from 800 to 6000 and optionally, chain extenders or crosslinkers having a molecular weight of up to 800 to form the polyurethane elastomer.

2. A process according to claim 1, wherein step c) is carried out in the presence of a catalyst, additive, and/or blowing agent.

3. A process according to claim 2, wherein the blowing agent is selected from the group consisting of alkanes having from 4 to 8 carbon atoms, cycloalkanes having from 4 to 6 carbon atoms, water, and mixtures thereof.

4. A process according to claim 1, wherein the first polyhydroxyl compound is difinctional, has a molecular weight of from 800 to 3500 and is selected from the group consisting of polyester polyols, hydroxyl containing polycarbonates, and polybutylene glycols, and mixtures thereof.

5. A process according to claim 1, wherein the organic diisocyanate in step a) comprises diphenylmethane-4,4'-diisocyanate.

6. A process according to claim 1, wherein the elastomers have a density of from 0.2 to 1.1 grams per liter.

7. A process according to claim 2, wherein the elastomers have a density of from 0.2 to 1.1 grams per liter.

8. A process according to claim 1, wherein step a) comprises reacting the first polyhydroxy compound with the organic polyisocyanate, and further, with a partial amount of the 1,4-phenylene diisocyanate.

9. A process according to claim 8, wherein in step a) the first polyhydroxyl compound is reacted with a composition comprising a flowable mixture of 1,4-phenylene diisocyanate and at least one additional isocyanate selected from the group consisting of toluene diisocyanate, diphenylmethane diisocyanate, 3,3'-dimethylbiphenyl diisocyanate, 1,2-diphenylethane diisocyanate, hexamethylene-1,6-diisocyanate, and 1-isocyanato-3,3,5-trimethyl-5-isocyanatomethylcyclohexane.

10. A process according to claim 8, wherein a partial amount of 1,4-phenylene diisocyanate is added immediately after the organic diisocyanate, and the other partial amounts of 1,4-phenylene diisocyanate are incorporated into the reaction mixture during a cooling phase.

11. A prepolymer prepared by reacting at least one polyhydroxyl compound or a mixture of polyhydroxyl compound and a chain extender or crosslinker with at least one organic diisocyanate selected from the group consisting of toluene diisocyanate, diphenylmethane diisocyanate, 3,3'-dimethylbiphenyl diisocyanate, 1,2-diphenylethane diisocyanate, hexamethylene diisocyanate, and 1-isocyanato-3,3,5-trimethyl-5-isocyanato-methylcyclohexane to give a polyaddition product containing urethane and isocyanate groups and having an NCO content of from 0.05 to 8 percent by weight, and reacting this polyaddition product with 1,4-phenylene diisocyanate to give a prepolymer containing isocyanate groups, wherein the equivalence ratio of the hydroxyl groups in the polyhydroxyl compound or mixture of polyhydroxyl compound and chain extender or crosslinker to the isocyanate groups in the organic diisocyanate to the isocyanate groups in the 1,4-phenylene diisocyanate is 1:>1–6:0.02–6, and wherein the NCO content of the prepolymer is from 3.3 to 10 percent by weight.

12. A prepolymer according to claim 11, wherein the at least one organic diisocyanate comprises diphenylmethane-4,4'-diisocyanate.

13. A prepolymer according to claim 11, wherein the difunctional polyhydroxyl compound has a number average molecular weight of from 800 to 3500 and is selected from the group consisting of polyester polyols, hydroxyl-containing polycarbonates, and polyoxytetramethylene glycols.

14. A prepolymer comprising the reaction product of 1,4-phenylene diisocyanate and a polyaddition product, wherein the polyaddition product comprises the reaction product of at least one polyhydroxyl compound or a mixture of polyhydroxyl compound and a chain extender or crosslinker with at least one organic diisocyanate selected from the group consisting of toluene diisocyanate, diphenylmethane diisocyanate, 3,3'-dimethylbiphenyl diisocyanate, 1,2-diphenylethane diisocyanate, hexamethylene diisocyanate, and 1-isocyanato-3,3,5-trimethyl-5-isocyanato-methylcyclohexane, wherein the NCO content of the prepolymer is from 3.3 to 10 percent by weight, and wherein the equivalence ratio of the hydroxyl groups in the polyhydroxyl compound or mixture of polyhydroxyl compound and chain extender or crosslinker to the isocyanate groups in the organic diisocyanate to the isocyanate groups in the 1,4-phenylene diisocyanate is 1:>1–6:0.02–6.

15. A prepolymer according to claim 14, wherein the organic diisocyanate comprises diphenylmethane-4,4'-diisocyanate.

16. A prepolymer according to claim 14, wherein the difunctional polyhydroxyl compound has a number average molecular weight of from 800 to 3500 and is selected from the group consisting of polyester polyols, hydroxyl-containing polycarbonates, and polyoxytetramethylene glycols.

* * * * *